(12) United States Patent
Inoue

(10) Patent No.: US 11,363,651 B2
(45) Date of Patent: Jun. 14, 2022

(54) INFORMATION PROCESSING APPARATUS, TERMINAL APPARATUS, INFORMATION PROCESSING METHOD AND PROGRAM

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 16/640,122

(22) PCT Filed: Nov. 2, 2018

(86) PCT No.: PCT/JP2018/040808
§ 371 (c)(1),
(2) Date: Feb. 19, 2020

(87) PCT Pub. No.: WO2019/088247
PCT Pub. Date: May 9, 2019

(65) Prior Publication Data
US 2021/0195668 A1 Jun. 24, 2021

(30) Foreign Application Priority Data
Nov. 6, 2017 (JP) .............................. JP2017-213924

(51) Int. Cl.
*H04W 76/00* (2018.01)
*H04W 76/14* (2018.01)
(Continued)

(52) U.S. Cl.
CPC .......... *H04W 76/14* (2018.02); *G06F 3/1203* (2013.01); *G06F 3/1236* (2013.01);
(Continued)

(58) Field of Classification Search
CPC ..... H04W 76/14; H04W 8/005; H04W 84/12; G06F 3/1203; G06F 3/1236; G06F 3/1292
See application file for complete search history.

(56) References Cited

U.S. PATENT DOCUMENTS 7,613,426 B2 11/2009 Kuehnel
8,903,987 B2 12/2014 Sato
(Continued)

FOREIGN PATENT DOCUMENTS

CN 101341686 A 1/2009
CN 101888686 A 11/2010
(Continued)

OTHER PUBLICATIONS

International Search Report issued in Intl. Appln. No. PCT/JP2018/040808 dated Feb. 5, 2019.
(Continued)

*Primary Examiner* — Khai M Nguyen
(74) *Attorney, Agent, or Firm* — Rossi, Kimms & McDowell LLP

(57) ABSTRACT

An object of the preset invention is to prevent unnecessary wireless connection from being established and to improve security. An information processing apparatus includes: a notifying unit that notifies a plurality of services which the information processing apparatus provides; a receiving unit that receives a connection request in which one service among the plurality of services is designated, from a terminal apparatus; and a controlling unit that when allowing the connection request, establishes a connection with the terminal apparatus, based on a communication method of wireless communication concerning the connection request and the
(Continued)

designated service, and when not allowing the connection request, does not establish the connection with the terminal apparatus.

10 Claims, 11 Drawing Sheets

(51) Int. Cl.
*G06F 3/12* (2006.01)
*H04W 8/00* (2009.01)
*H04W 84/12* (2009.01)

(52) U.S. Cl.
CPC .......... *G06F 3/1292* (2013.01); *H04W 8/005* (2013.01); *H04W 84/12* (2013.01)

(56) References Cited

U.S. PATENT DOCUMENTS

| | | | |
|---|---|---|---|
| 9,661,445 B2 | 5/2017 | Abraham | |
| 10,368,232 B2* | 7/2019 | Sandhu | H04W 76/14 |
| 10,506,416 B2 | 12/2019 | Saito | |
| 10,585,634 B2 | 3/2020 | Yasukawa | |
| 2006/0036679 A1 | 2/2006 | Goodman | |
| 2007/0140243 A1 | 6/2007 | Eastham | |
| 2010/0304752 A1* | 12/2010 | Kitahara | H04W 76/18 |
| | | | 455/450 |
| 2014/0044010 A1 | 2/2014 | Hiroshige | |
| 2015/0169269 A1 | 6/2015 | Ueda | |
| 2015/0350905 A1* | 12/2015 | Suzuki | H04L 63/08 |
| | | | 726/7 |
| 2016/0050551 A1* | 2/2016 | Qi | H04W 76/14 |
| | | | 455/434 |
| 2016/0127996 A1* | 5/2016 | Patil | H04W 48/16 |
| | | | 370/311 |
| 2016/0353233 A1 | 12/2016 | Yong | |
| 2017/0208559 A1 | 7/2017 | Tamura | |
| 2018/0213387 A1 | 7/2018 | Aoki | |
| 2018/0310232 A1 | 10/2018 | Satyanarayana | |

FOREIGN PATENT DOCUMENTS

| | | | | |
|---|---|---|---|---|
| CN | 102083146 A | 6/2011 | | |
| CN | 107925860 A | 4/2018 | | |
| CN | 108121519 A | 6/2018 | | |
| CN | 108418896 A | 8/2018 | | |
| EP | 2257100 A1 | 12/2010 | | |
| EP | 2645812 A2 | 10/2013 | | |
| EP | 2950560 A1 | 12/2015 | | |
| EP | 3101874 A1 | 12/2016 | | |
| EP | 3382528 A1 * | 10/2018 | .......... | G06F 1/3284 |
| JP | 2003209877 A | 7/2003 | | |
| JP | 2010278565 A | 12/2010 | | |
| JP | 2017063312 A | 3/2017 | | |
| WO | 2004043107 A1 | 5/2004 | | |

OTHER PUBLICATIONS

Written Opinion issued in Intl. Appln. No. PCT/JP2018/040808 dated Feb. 5, 2019.
PCT Collaborative Search and Examination Peer ISA Contribution for Intl. Appln. No. PCT/JP2018/040808 from China, Europe, Korea, and US.
Wi-Fi Alliance. "Neighbor Awareness Networking Technical Specification, Version 2.0." Oct. 20, 2017: pp. 22 and 23. 13 pages. Cited in NPL 1 and NPL 2.
Office Action issued in Chinese Appln. No. 201880070648.2 dated Aug. 24, 2021. English translation provided.

* cited by examiner

| Type | example |
|---|---|
| Service name | " print service " |
| IP address | " fe 80 ::ab :cd :12:34 :00 :31 " |
| Port Number | " 631 " |
| Service path | " / printservice " |
| P2P Flag | " not allowed " |

501

| Type | example |
|---|---|
| Service name | " print service for guest " |
| IP address | " fe 80 ::78 :90 :aa :bb :23 :23 " |
| Port number | " 631 " |
| Service Path | " / guestprintservice " |
| P2P Flag | " allowed " |

INFORMATION PROCESSING APPARATUS, TERMINAL APPARATUS, INFORMATION PROCESSING METHOD AND PROGRAM

TECHNICAL FIELD

The present invention relates to an information processing apparatus, a terminal apparatus, an information processing method and a program.

BACKGROUND ART

In Wi-Fi Alliance Certification Program Wi-Fi Aware, NAN (Neighbor Awareness Networking) is provided that can detect services which close terminals provide. A terminal in a NAN cluster detects the services by exchanging a Publish message which is a signal for searching for the services, and a Subscribe message for notifying that the services are provided. In PTL 1, a communication device is disclosed which detects a chat service using the NAN, then establishes a data link, and executes a chat application.

The NAN device can detect the services in the NAN cluster, but it is necessary to separately establish a wireless connection for communication of an application for actually using the service after the service has been detected. As for the wireless connection, two types can be considered that are a direct wireless connection of directly using a NAN interface which has been used for service detection, and a wireless connection via an access point. However, there is a case where only service notification may be performed and it is not necessary so far as to perform wireless connection, though depending on the type of services.

CITATION LIST

Patent Literature

PTL 1: Japanese Patent Application Laid-Open No. 2017-63312

SUMMARY OF INVENTION

Solution to Problem

An information processing apparatus according to an aspect of the present invention comprises: a notifying unit that notifies a plurality of services which the information processing apparatus provides; a receiving unit that receives a connection request in which one service among the plurality of services is designated, from a terminal apparatus; and a controlling unit that when allowing the connection request, establishes a connection with the terminal apparatus, based on a communication method of wireless communication concerning the connection request and the designated service, and when not allowing the connection request, does not establish the connection with the terminal apparatus.

Further features of the present invention will become apparent from the following description of exemplary embodiments with reference to the attached drawings.

BRIEF DESCRIPTION OF DRAWINGS

FIG. 6 is a view illustrating an example of a service notifying packet.

DESCRIPTION OF EMBODIMENTS

The embodiments of the present invention will be described below with reference to the drawings.

Embodiment 1

Figure 1:
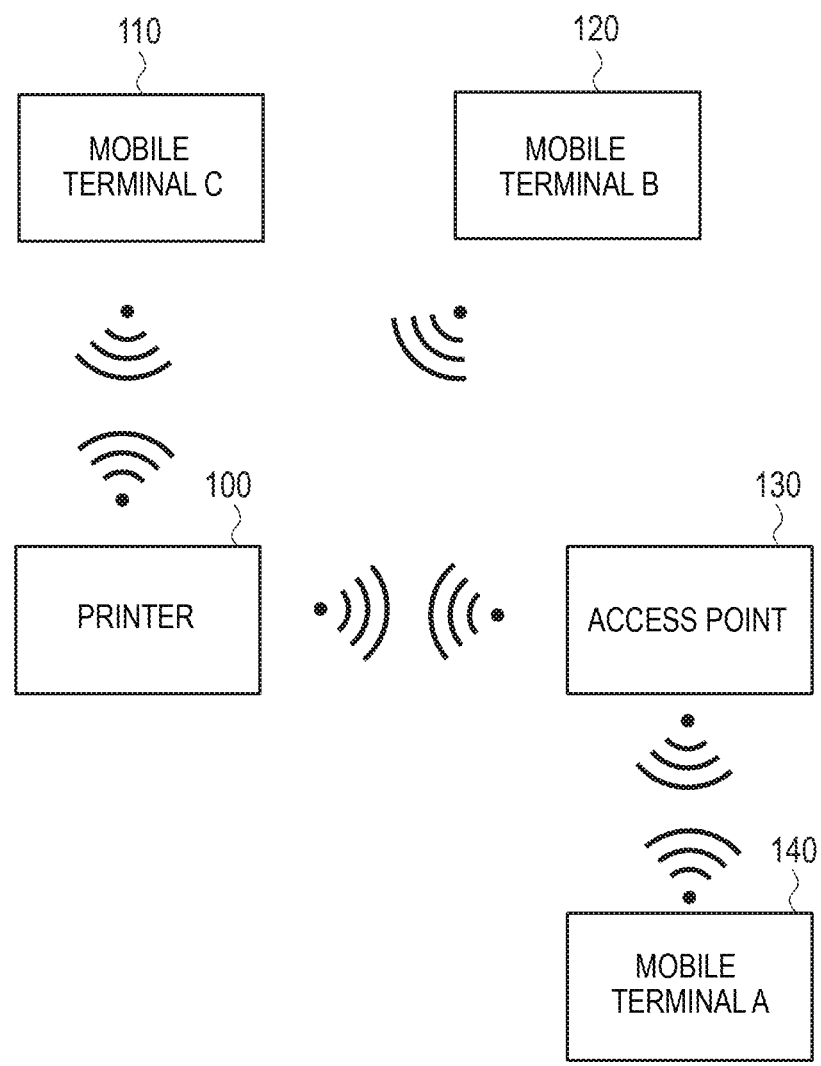
FIG. 1 is a diagram illustrating one example of a system configuration of a communication system.
Figure 2:
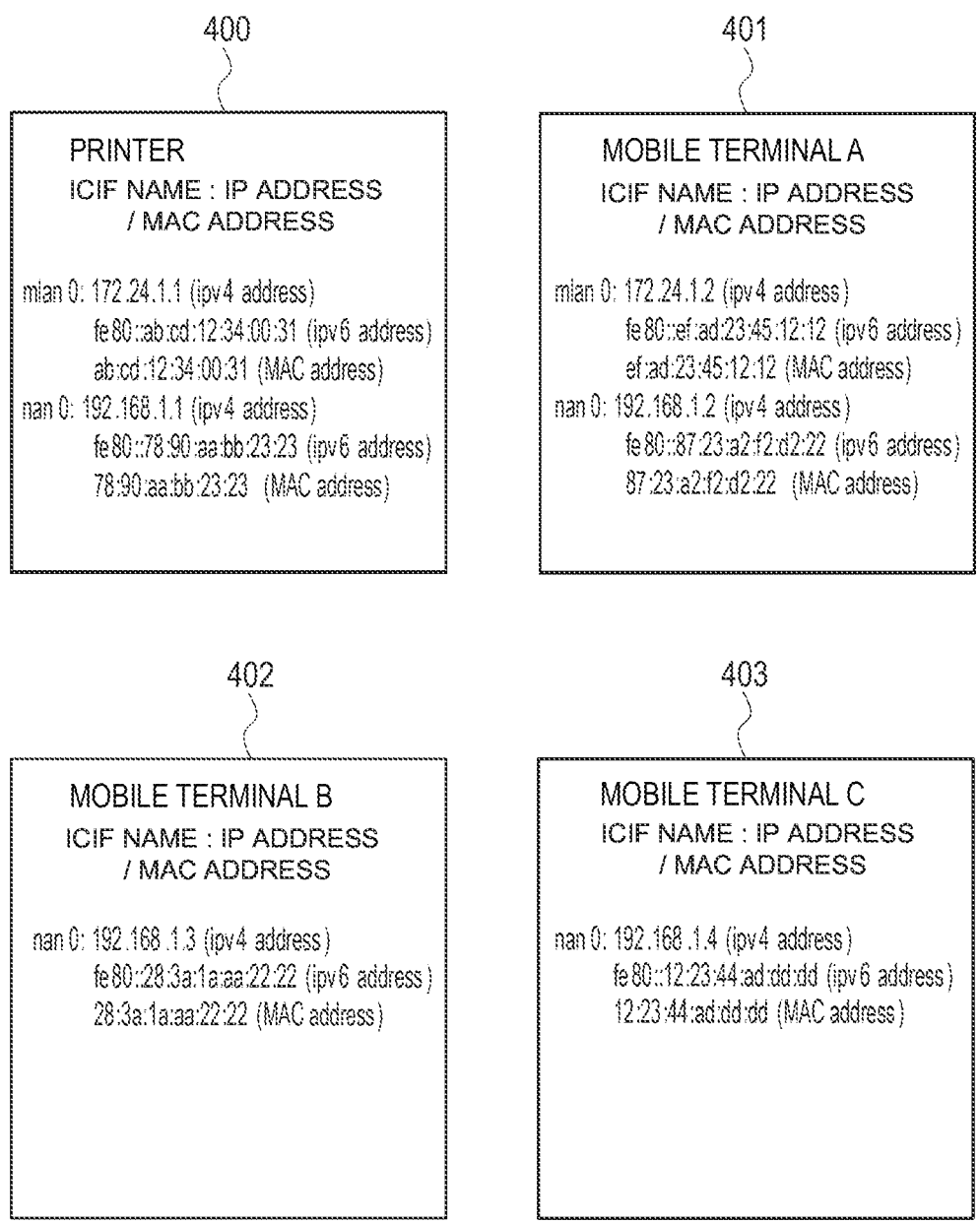
FIG. 2 is a view illustrating one example of network information of each device.

In Embodiment 1, a process will be described below which controls whether or not a printing apparatus 100 permits or rejects a connection request for a direct wireless connection, according to a service. In Embodiment 1, an example with the use of the printing apparatus 100 will be described, but the processes and the like of the embodiments which will be described below are not limited to those in the example. The processes and the like of the embodiments to be described below can be applied to various information processing apparatuses in place of the printing apparatus 100, such as a camera, a projector, a scanner, a three-dimensional printer, a television, a game machine and a mobile telephone terminal, which notify that services are provided by using wireless communication. In the following, the printing apparatus 100 will be described as an example. FIG. 1 is a diagram illustrating one example of a system configuration of a communication system. The printing apparatus 100 has an interface of wireless LAN, and performs direct wireless communication that is not via an access point, with a mobile terminal C110 and a mobile terminal B120 each of which also has an interface of the wireless LAN. Examples of direct wireless communication include communication through Wi-Fi Direct and Wi-Fi Aware. In addition, the printing apparatus 100 performs wireless communication also with a mobile terminal A140 via an access point 130. In the present specification, an interface that performs wireless communication via the access point is expressed as an interface on an infrastructure side. In addition, each device holds network information such as an interface name, an IP address and a MAC address in FIG. 2. The interface via the access point shall be represented by mlan 0 (MLAN0), and the interface of Wi-Fi Aware shall be represented by nan0 (NAN0). FIG. 2 is a view illustrating one example of network information of each device. Network information 400 is network information of the printing apparatus 100. The network information 401 is network information of the mobile terminal A140. Network information 402 is network information of the mobile terminal B120. Network information 403 is network information of the mobile terminal C110. The access point 130 is one example of a relay apparatus.

In a NAN service, a terminal in a NAN cluster exchanges a Publish message which is a signal for searching a service, and a Subscribe message for notifying that the service is provided, and detects and/or provides the services. For example, the printing apparatus 100 periodically publishes a service. The mobile telephone terminal subscribes to the published information, thereby can detect the service provided by the printing apparatus 100, and can receive the service.

Figure 3:
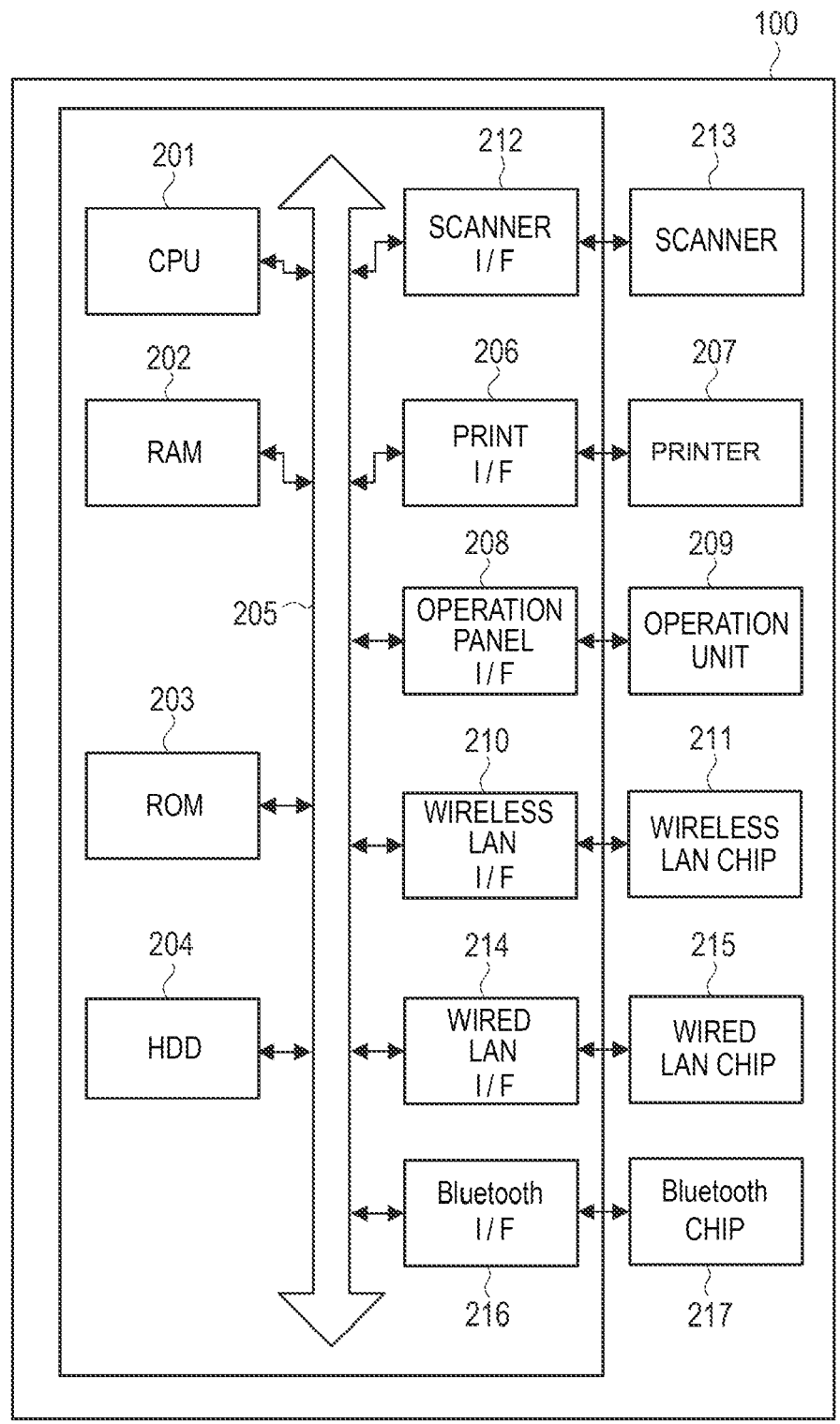
FIG. 3 is a diagram illustrating one example of a hardware configuration of a printing apparatus.

FIG. 3 is a diagram illustrating one example of a hardware configuration of the printing apparatus 100.

The CPU 201 controls the whole printing apparatus 100. More specifically, the CPU 201 develops a program stored in a ROM 203 or an HDD 204 into a RAM 202, executes the process, and thereby achieves a function of the printing apparatus 100 and processes of flow charts in FIG. 7 and FIG. 8 which will be described later. In addition, the CPU 201 develops a program stored in the ROM 203 or the HDD 204 into the RAM 202, executes the process, and thereby achieves a process which is performed by the printing apparatus 100 in FIG. 9 and will be described later. The CPU 201 exchanges data with the RAM 202, the ROM 203, the HDD 204, a scanner I/F 212, a print I/F 206, an operation panel I/F 208, a wireless LAN I/F 210, a wired LAN I/F 214, and a Bluetooth (registered trademark) I/F 216, via a bus.

The ROM 203 stores the programs. The RAM 202 is used as a temporary storage area for a main memory and a work area of the CPU 201. The HDD 204 stores: various data such as print data and scanned images; programs; and the like.

A printer 207 executes print processing based on print data received from an external device, a scanned image generated by a scanner 213, and the like, under control of the CPU 201. The scanner 213 reads a document and generates a scanned image (read image data). The scanned image generated by the scanner 213 is printed by the printer 207 or stored in the HDD 204.

The print I/F 206 is an interface between the CPU 201 and the printer 207. The print I/F 206 can transmit the print data transmitted from the CPU 201, to the printer 207, and can transmit the state of the printer which the print I/F 206 has received from the printer 207, to the CPU 201.

The scanner I/F 212 is an interface between the CPU 201 and the scanner 213. The scanner I/F 212 can transmit an image reading instruction which has been transmitted from the CPU 201, to the scanner 213, and can transmit the image data which the scanner I/F has received from the scanner 213, to the CPU 201. In addition, the scanner I/F 212 can transmit the state of the scanner 213 which the scanner I/F has received from the scanner 213, to the CPU 201.

The operation panel I/F 208 is an interface between the CPU 201 and an operation unit 209. The operation panel I/F 208 can transmit an instruction from the user input from the operation unit 209, to the CPU 201, and can transmit screen information for the user to operate, to the operation unit 209.

The printer 207 can print the image data having received from the print I/F 206, on a sheet, and transmit the state of the printer 207, to the print I/F 206.

The scanner 213 can read the paper placed on the scanner 213 according to the image reading instruction having received from the scanner I/F 212, digitize the contents, and transmit the digitized contents to the scanner I/F 212. In addition, the scanner 213 can transmit the state of the scanner 213, to the scanner I/F 212.

The operation unit 209 is a user interface which the printing apparatus 100 provides. The operation unit 209 is equipped with a liquid crystal screen, for example, having a touch panel, provides an operation screen to the user, and also accepts an operation from the user.

The wireless LAN interface (wireless LAN I/F) 210 achieves wireless communication with an external device via a wireless LAN chip 211. As for a connection type of wireless LAN, there are connection types such as wireless infrastructure and wireless direct.

A wired LAN interface (wired LAN I/F) 214 executes communication with an external device such as a PC terminal, through a wired LAN via a wired LAN chip 215.

The Bluetooth interface (Bluetooth I/F) 216 executes communication with an external device such as a PC terminal, through Bluetooth via a Bluetooth chip 217.

Figure 4:
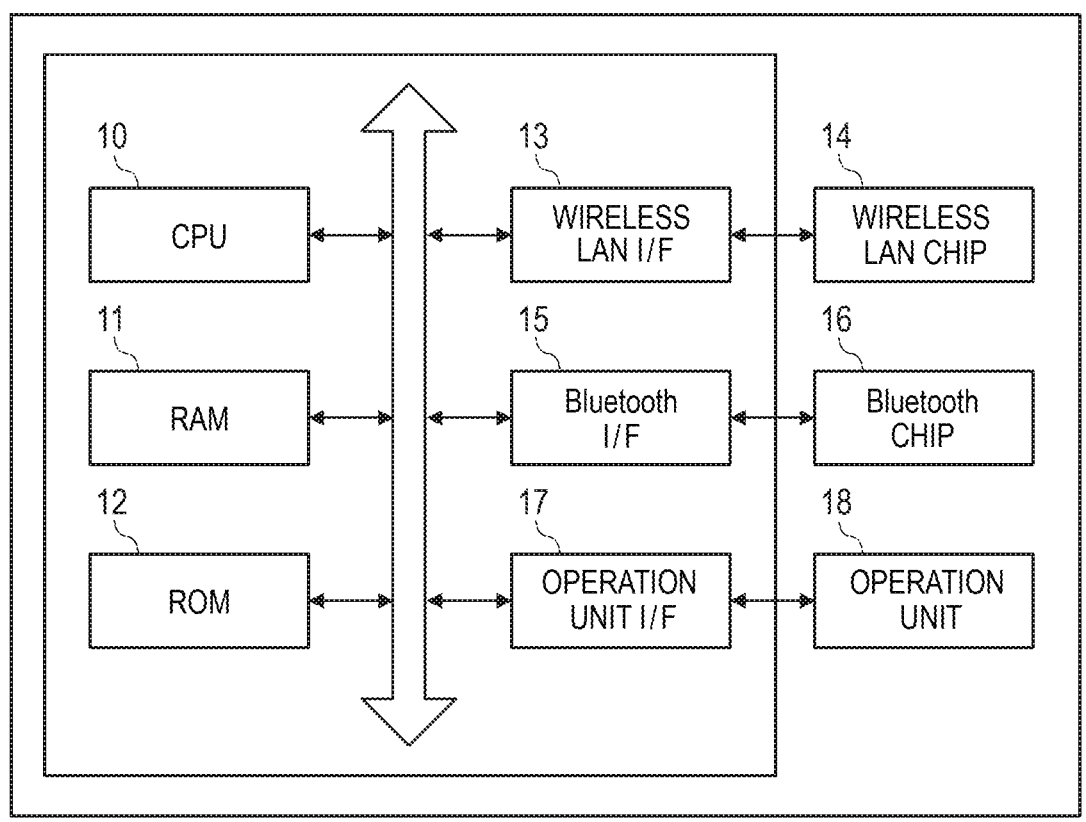
FIG. 4 is a diagram illustrating one example of a hardware configuration of a mobile terminal.

FIG. 4 is a diagram illustrating one example of a hardware configuration of a mobile terminal.

A CPU 10 controls the whole mobile terminal. More specifically, the CPU 10 develops a program stored in a ROM 12 into a RAM 11, executes the process, and thereby achieves the function of the mobile terminal and processes in a flowchart of FIG. 11 which will be described later. In addition, each of the CPUs 10 of mobile terminals develops a program stored in each of the ROMs 12 into the respective RAMs 11, executes the process, and thereby achieves a process that each mobile terminal in FIG. 9 will execute, which will be described later. The CPU 10 exchanges data with the RAM 11, the ROM 12, an operation unit I/F 17, a wireless LAN I/F 13 and a Bluetooth I/F 15, via a bus.

The ROM 12 stores programs, data to be used when the CPU 10 executes the processes, and the like. The RAM 11 is used as a temporary storage area for a main memory and a work area of the CPU 10.

The operation unit I/F 17 is an interface between the CPU 10 and an operation unit 18. The operation unit I/F 17 can transmit an instruction from the user, which has been input from the operation unit 18, to the CPU 10, and can transmit screen information for the user to operate, to the operation unit 18.

The operation unit 18 is an interface which the mobile terminal provides. The operation unit 18 is equipped with a liquid crystal screen, for example, having a touch panel, provides an operation screen to the user, and also accepts an operation from the user.

The wireless LAN interface (wireless LAN I/F) 13 achieves wireless communication with an external device via a wireless LAN chip 14. As for the connection type of wireless LAN, there are the connection types such as the wireless infrastructure and the wireless direct.

The Bluetooth interface (Bluetooth I/F) 15 executes communication with an external device such as a PC terminal, through Bluetooth via a Bluetooth chip 16.

Figure 5:
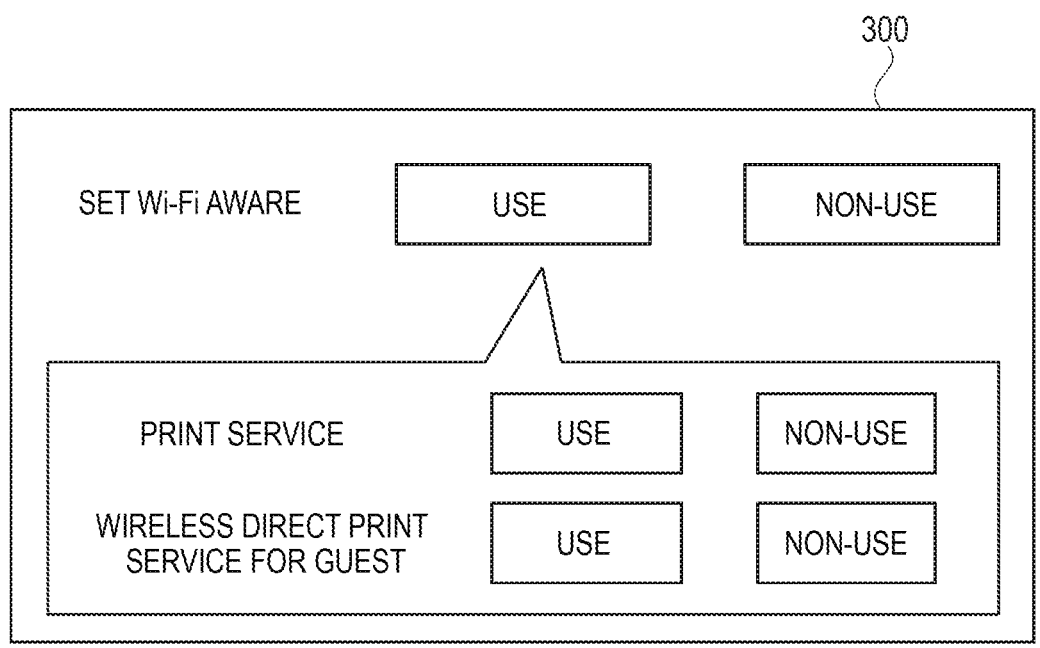
FIG. 5 is a view illustrating one example of a screen of a printing apparatus.

FIG. 5 is a view illustrating one example of a screen of the printing apparatus 100. In a screen 300 displayed on the operation unit 209, the user can select any one of "use" and "non-use" for "Set Wi-Fi Aware". When "use" is selected, the printing apparatus 100 enables the function of the Wi-Fi Aware. When "non-use" is selected, the printing apparatus 100 disables the function of the Wi-Fi Aware. When "use" is selected for "Set Wi-Fi Aware", the user can further set which service the user enables through Wi-Fi Aware. In an example of the present embodiment, the user can select "use" or "non-use" for each of the services of "print service" and "wireless direct print service for guest", via the screen. The "print service" is a service that performs printing via the access point. The "wireless direct print service for guest" is a service that performs printing through direct wireless connection with the use of Wi-Fi Direct, Wi-Fi Aware or the like, without via the access point. For example, in an office network or the like, the network can be set so that only a mobile terminal which has been previously subjected to an authentication process can connect to the network of the office. Accordingly, a mobile terminal that can communicate with the printing apparatus 100 through the office network, in other words, via the access point can be regarded as a terminal which has been subjected to the authentication process and is reliable. On the other hand, a user who is not a worker of the office but a guest or the like who has temporarily come to the office does not pass the authentication of the office network, and accordingly cannot connect also to the access point of the office. However, when a user such as the guest wishes to temporarily use the printing apparatus, the communication system of the present embodiment enables the user to perform printing, by connecting the printing apparatus to the mobile terminal through the direct wireless connection.

When the "print service" is set at the "use", the printing apparatus 100 periodically transmits a service notification such as a service notifying packet 500 in FIG. 6, through a NAN. The printing apparatus 100 stores the "print service" for the "service name", and stores the "fe80::ab:cd:12:34:00:31" which is an MLAN interface via the access point, for the "IP address". In FIG. 6, an IPv6 address is stored, but an IPv4 address of "172.24.1.1" may be stored. In addition, the printing apparatus 100 stores a port number of a TCP according to which a printing application operates, for "port number", and stores a URL path through which the printing application operates, for "service path". The area of "P2PFlag" will be described in Embodiment 2 which will be described later.

When the "wireless direct print service for guest" is set at "use", the printing apparatus 100 periodically transmits a service notification such as a service notifying packet 501 in FIG. 6, through the NAN. The printing apparatus 100 stores "print service for guest" for the "service name", and stores "fe80::78:90:aa:bb:23:23" which is the NAN interface via the access point, for the "IP address". In FIG. 6, an IPv6 address is stored, but an IPv4 address of "192.168.1.1" may be stored. In addition, the printing apparatus 100 stores the port number of the TCP according to which the printing application operates, for "port number", and stores the URL path through which the printing application operates, for "service path".

Figure 7:
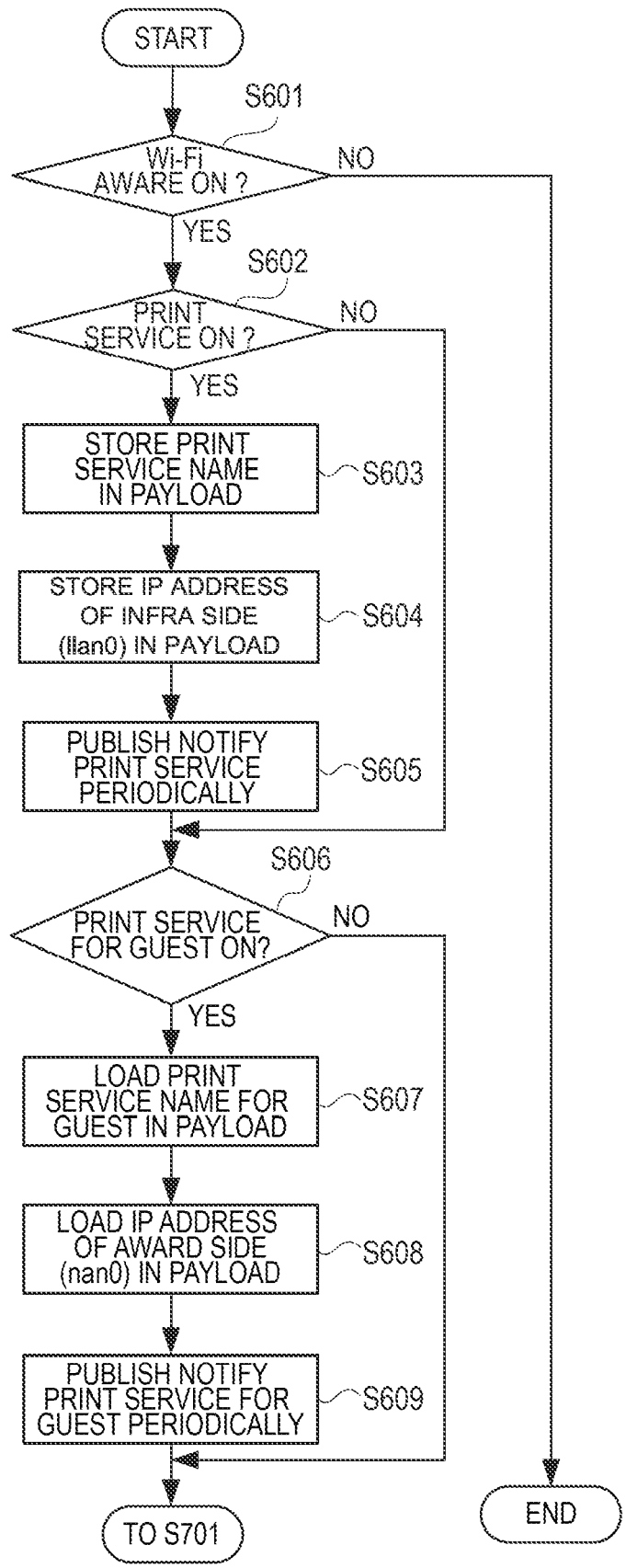
FIG. 7 is a flowchart (part 1) illustrating one example of information processing executed by a printing apparatus.

Next, a process for performing the NAN transmission on boot-up in the printing apparatus 100 will be described with reference to the flowchart of FIG. 7. The process of the flowchart in FIG. 7 is one example of a process of notifying a plurality of services which the printing apparatus 100 provides.

After the power of the printing apparatus 100 has been turned on, in S601, the CPU 201 acquires the set value as to whether the Wi-Fi Aware is set at use or not, from the HDD 204 or the like via the screen 300 in FIG. 5, and determines whether Wi-Fi Aware is set at use or not. In the case where the non-use is set, the CPU 201 ends the process of the flowchart of FIG. 7, and in the case where the use is set, the CPU 201 proceeds to S602.

In S602, the CPU 201 acquires a set value of the print service in FIG. 5 from the HDD 204 or the like. When the set value of the print service in FIG. 5 is "use", the CPU 201 proceeds to S603 and S604 to generate a packet to be notified through the NAN, and when the set value is "non-use", the CPU 201 proceeds to S606.

More specifically, in S603 and S604, the CPU 201 stores the print service name, the IP address and other items, in the respective fields of the packet, as described in FIG. 6.

When packet data to be notified as the service notifying packet 500 in FIG. 6 has been completed, the CPU 201 periodically transmits the packet data through the NAN in S605.

Next, in S606, the CPU 201 acquires a set value of the wireless direct print service for guest in FIG. 5, from the HDD 204 or the like. When the set value of the wireless direct print service for guest in FIG. 5 is "use", the CPU 201 proceeds to S607 and S608 to generate a packet to be notified through the NAN; and when the set value is "non-use", the CPU 201 proceeds to S701. More specifically, in S607 and S608, the CPU 201 stores the print service name, the IP address and other items, in the respective fields of the packet, as described in FIG. 6.

When packet data to be notified as the service notifying packet 501 in FIG. 6 has been completed, the CPU 201 periodically transmits the packet data through the NAN in S609.

Figure 8:
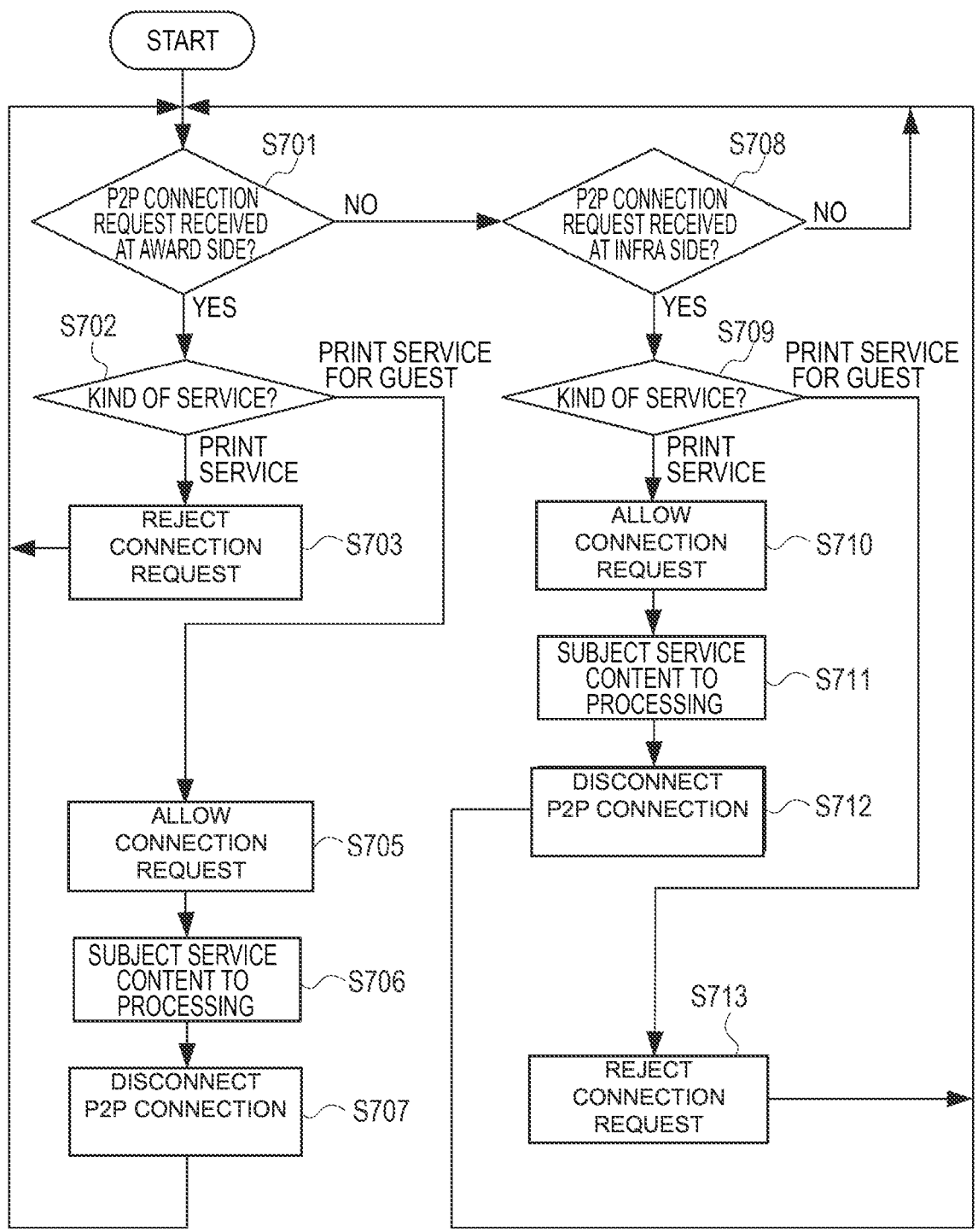
FIG. 8 is a flowchart (part 2) illustrating one example of information processing executed by a printing apparatus.

Next, with reference to the flowchart of FIG. 8, the process of the case where a connection request for a service has been received from a mobile terminal during the periodical transmission through the NAN in the printing apparatus 100 will be described.

In S701, the CPU 201 determines whether or not the printing apparatus 100 has received a connection request from the mobile terminal, at the interface through which the NAN is operating. This connection request is a connection request in a wireless layer. In addition, this connection request is one example of a connection request in which one service among the plurality of services notified by the process of the flowchart in FIG. 7 is designated. When the connection request has been received from the mobile terminal at the interface through which the NAN is operating, the CPU 201 proceeds to S702; and when the printing apparatus 100 has not received the connection request from the mobile terminal at the interface through which the NAN is operating, the CPU 201 proceeds to S708.

In S702, the CPU 201 determines for which service the connection request has been received. When the CPU 201 has determined that the print service has received the connection request, the CPU 201 proceeds to S703, because the print service operates only via the access point and accordingly does not operate at the NAN interface. In addition, when the CPU 201 determines that the print service for guest has received the connection request, the CPU 201 proceeds to S705, because the print service for guest operates at the NAN interface.

In S703, the CPU 201 rejects the connection request for the service.

In S705, the CPU 201 allows the connection request for the service, and establishes the connection in the wireless layer.

In S706, the CPU 201 executes the print processing, based on a request for the print processing or the like transmitted from the mobile terminal through TCP communication.

When the print processing has been completed, the CPU 201 ends the connection in the wireless layer, in S707. Then, the CPU 201 returns to S701.

In S708, the CPU 201 determines whether a connection request for the TCP has been received from the MLAN interface which is connected to the access point. This connection request is one example of a connection request in which one service among the plurality of services notified by the process of the flowchart in FIG. 7 is designated. When the CPU 201 has determined that the printing apparatus 100 has received through the MLAN, the CPU 201 proceeds to S709, when the CPU 201 has determined that the printing apparatus 100 has not received through the MLAN, the CPU 201 returns to S701.

In S709, the CPU 201 determines for which service the connection request is. When the CPU 201 has determined that the connection request is for the print service, the CPU 201 proceeds to S710; and when the CPU 201 has determined that the connection request is for the print service for guest, the CPU 201 proceeds to S713 because the print service for guest is a service operating at the NAN interface.

In S710, the CPU 201 allows the TCP connection request.

In S711, the CPU 201 executes the print processing, based on a request for the print processing from the mobile terminal or the like.

When the print processing has been completed, the CPU 201 ends the TCP connection in S712.

In S713, the CPU 201 rejects the connection request for the TCP.

Figure 9:
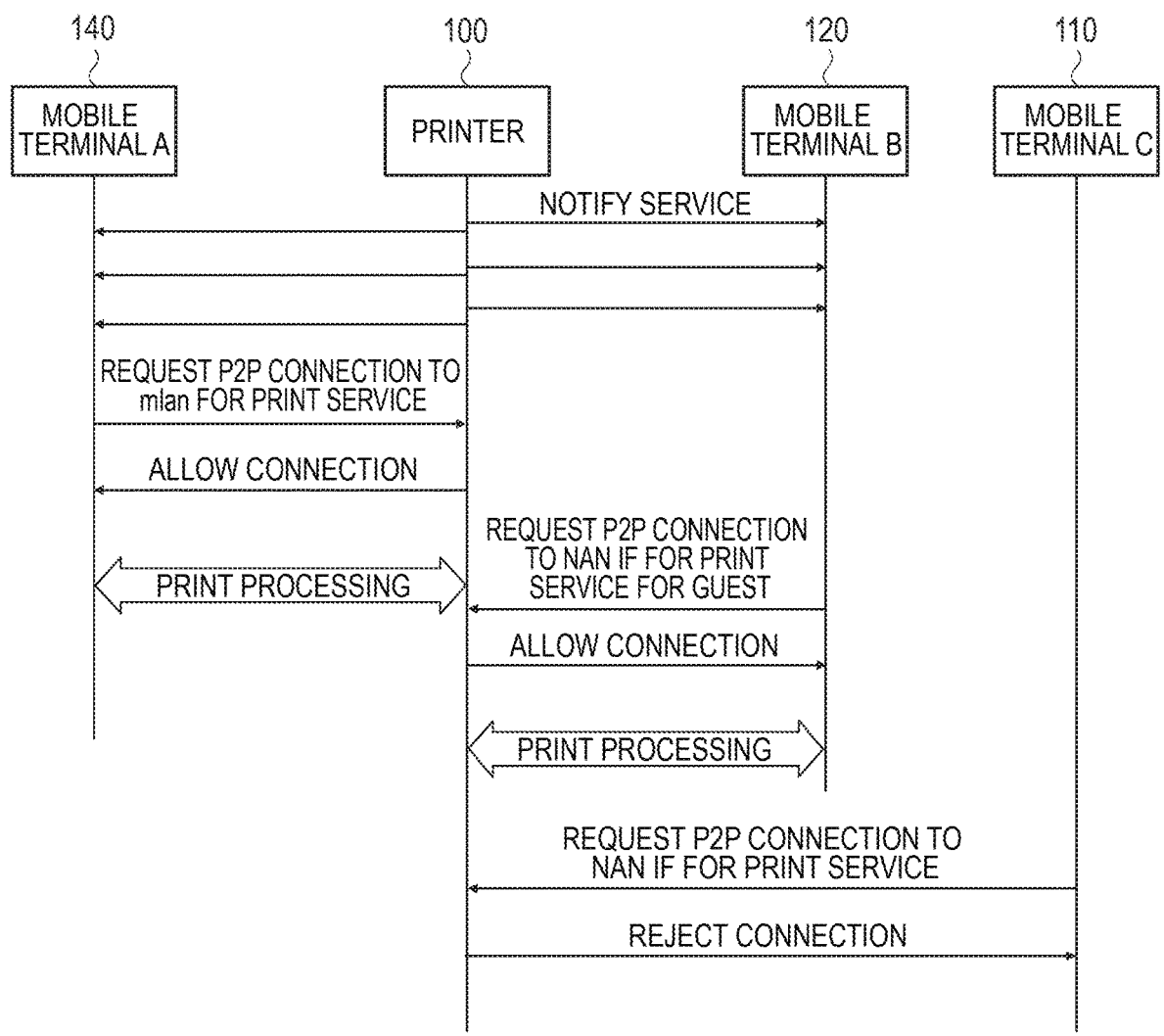
FIG. 9 is a sequence diagram illustrating one example of information processing in a communication system.

FIG. 9 is a sequence diagram illustrating one example of information processing in the communication system. After having detected the service through the NAN, the mobile terminal A140 and the printing apparatus 100 can execute the print service via the access point, and perform the print processing. After having detected the service through the NAN, the mobile terminal B120 and the printing apparatus 100 can execute the print service for guest at the NAN interface through the direct wireless connection, and perform the print processing. On the other hand, after having detected the service through the NAN, the mobile terminal C110 and the printing apparatus 100 try to execute the print service at the NAN interface, but the printing apparatus 100 regards the request as an incorrect connection request, and does not establish the connection.

In the case of a service which does not need to perform the direct wireless connection, if the mobile terminal and the printing apparatus establish the direct wireless connection, a security hole is formed; and accordingly the printing apparatus 100 controls whether to reject or allow the connection request, according to the service, and thereby can guarantee security.

Embodiment 2

In Embodiment 2, a process will be described in which a mobile terminal determines whether or not the mobile terminal should establish the direct wireless connection. In Embodiment 1, a control has been described in which the printing apparatus rejects when having received a connection request through a direct wireless connection that is not allowed. However, in Embodiment 2, the mobile terminal acquires the contents of the service notification, and determines whether or not the mobile terminal can perform the direct wireless connection. Because of this, in the case of a service which is not originally allowed from the mobile terminal, a request for the direct wireless connection cannot be transmitted from the mobile terminal.

Figure 10:
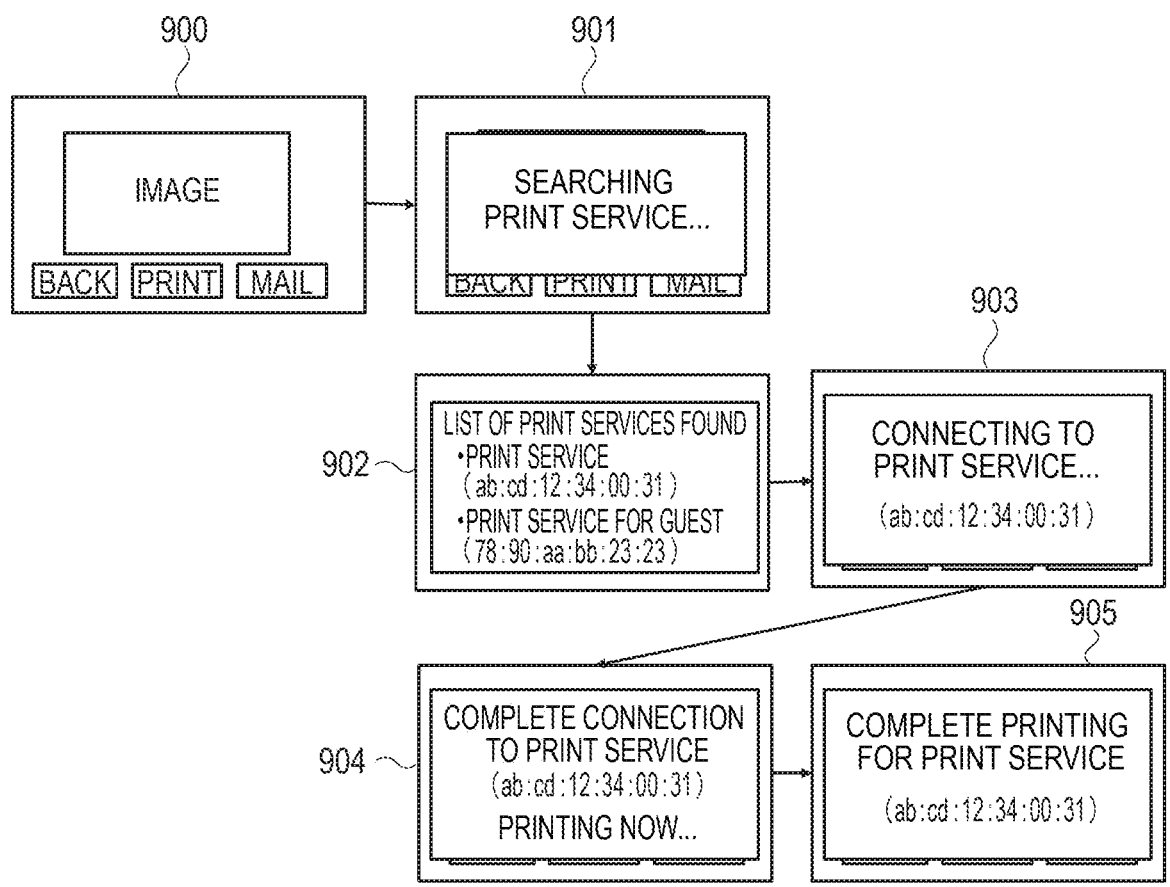
FIG. 10 is a diagram illustrating one example of an operation screen of a mobile terminal.

FIG. 10 is a diagram illustrating one example of the operation screen of the mobile terminal. Each of the screens is a screen displayed on the operation unit 18 by the CPU 10. A screen 900 is an example of a screen displaying an arbitrary photograph on the operation screen of the mobile terminal. In the screen 900, if the user desires to print this photograph, the user selects a button of "Print". When the "Print" button has been selected, the CPU 10 searches for printing services in the NAN cluster as illustrated in a screen 901. A screen 902 is an example of a screen for displaying a list of discovered NAN service names. The characters within the parentheses shows the MAC address of the terminal notifying the NAN service. On the screen 902, the user selects one desired print service. Then, as illustrated on a screen 903 and a screen 904, the mobile terminal establishes communication with the printing apparatus by an appropriate wireless connection method (communication method of wireless communication), and executes the print processing. When the print processing has been completed, the CPU 10 displays an end screen like a screen 905 on the operation unit 18.

Figure 11:
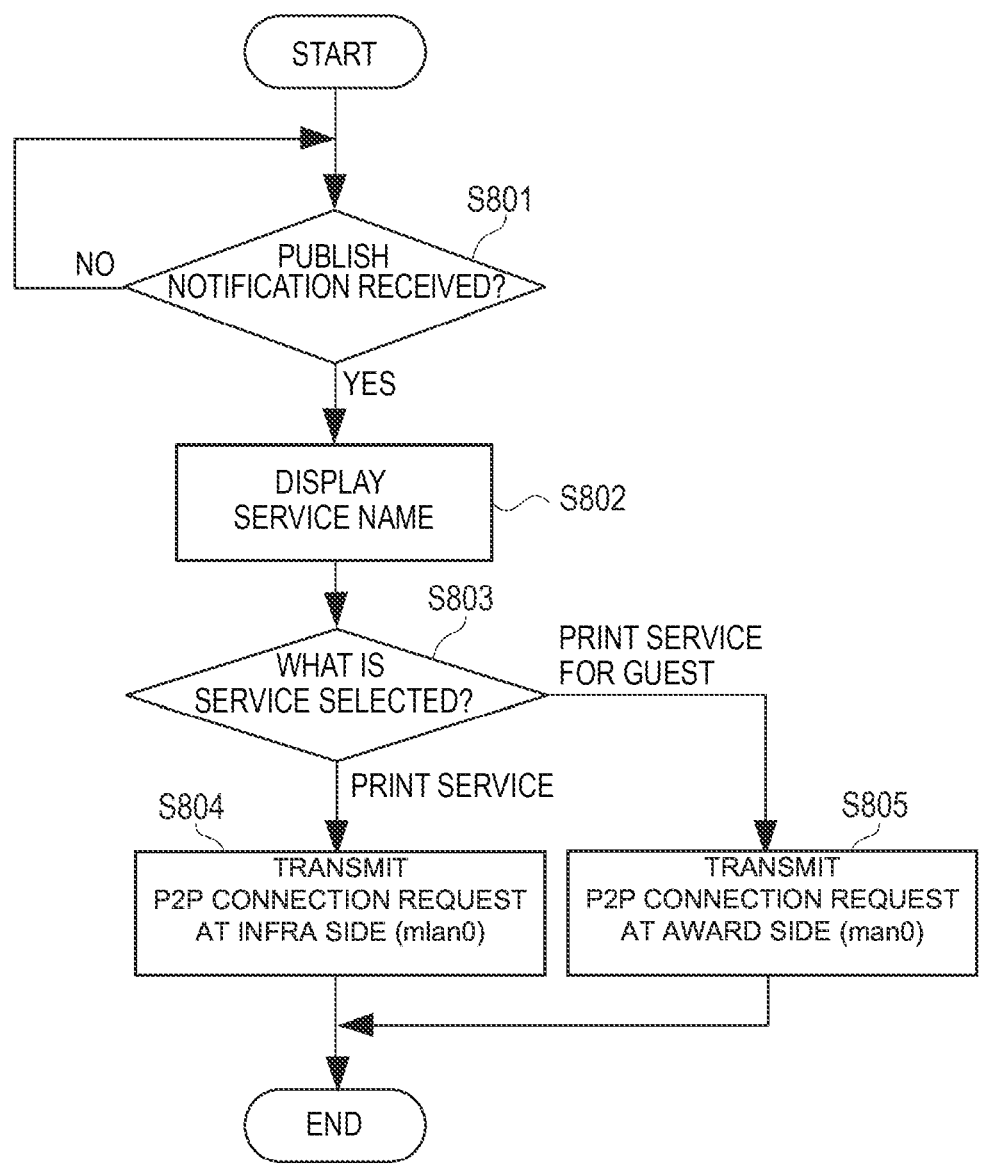
FIG. 11 is a flowchart illustrating one example of information processing executed by a mobile terminal.

FIG. 11 is a flowchart for controlling which wireless connection method the mobile terminal in Embodiment 2 uses.

When the NAN services is searched as illustrated on the screen 901, the CPU 10 determines whether or not the NAN service is notified, in S801. When the NAN service notification has been detected, the CPU 10 proceeds to S802, and when the NAN service notification has not been detected, the CPU 10 repeats the process of S801.

In S802, the CPU 10 displays a detected service list on the operation unit 18 as in the screen 902.

In S803, when a service is selected by the user, the CPU 10 determines a connection method according to the selected service. When the "print service" has been selected, the CPU 10 proceeds to S804; and when the "print service for guest" has been selected, the CPU 10 proceeds to S805.

In S804, the CPU 10 transmits a TCP connection request to the printing apparatus 100 via the MLAN interface, in other words, via the access point.

In S805, the CPU 10 transmits a request for the direct wireless connection via the NAN interface.

Due to a mobile terminal side selecting an appropriate connection method according to the service, an occurrence of such unnecessary processing can be prevented that rejection occurs due to the selection of an inappropriate connection method.

(Modified Example)

In addition, the selection of the above described connection method is an example in the case where the connection method corresponding to the service has been statically set beforehand in the mobile terminal. Instead of this method, the printing apparatus may be configured to include information as to whether or not the direct wireless connection method is possible, in the notifying packet of the NAN, as in the "P2PFlag" field of the NAN packet of FIG. 6. In this case, the CPU 10 of the mobile terminal acquires the "P2PFlag" field, and determines the connection method. For example, if "P2PFlag" is "not allowed", it means that the direct wireless connection through the NAN interface is impossible, and the CPU 10 tries connection through the MLAN interface via the access point. In addition, if the "P2PFlag" is "allowed", it means that the direct wireless connection through the NAN interface is possible, and the CPU 10 tries the connection through the NAN interface.

In the process of the present modified example, the mobile terminal side controls whether to directly establish the connection of the wireless communication or the connection via the access point, according to the service, and thereby can establish appropriate and reliable communication.

According to the above described embodiments, it is possible to prevent unnecessary wireless connection from being established and improve security.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-213924, filed Nov. 6, 2017, which is hereby incorporated by reference herein in its entirety.

The invention claimed is:

1. An information processing apparatus having a first service and a second service, the information processing apparatus comprising:
   at least one memory that stores instructions; and
   at least one processor that executes the instructions, the instructions, when executed, causing the information processing apparatus to:
   notify a plurality of services including at least the first service and the second service provided by the information processing apparatus;
   receive a Peer-to-Peer connection request in which one service among the plurality of services is designated, from a terminal apparatus;
   connect the information processing apparatus to the terminal apparatus with a direct wireless communication that is not via an external access point device, when the first service is designated by the received Peer-to-Peer connection request; and
   reject the connection request for connecting the information processing apparatus to the terminal apparatus with the direct wireless communication when the second service is designated by the received Peer-to-Peer connection request.

2. The information processing apparatus according to claim 1, wherein information of the first service and information of the second service are notified by periodically transmitting, to an external device, first message data notifying the information of the first service and second message data notifying the information of the second service.

3. The information processing apparatus according to claim 2, wherein a data format of the first message data and the second message data is a data format of a Publish message specified by Wi-Fi Neighbor Awareness Networking (NAN).

4. The information processing apparatus according to claim 2, wherein the at least one processor executes the instructions to further cause the information processing apparatus to set whether or not to transmit message data for each of the plurality of services.

5. The information processing apparatus according to claim 1, wherein a wireless communication established based on the received Peer-to-Peer connection request is a wireless communication that conforms to a Wi-Fi Aware standard.

6. The information processing apparatus according to claim 1, wherein a wireless communication established based on the received Peer-to-Peer connection request is a wireless communication that conforms to a Wi-Fi Direct standard.

7. The information processing apparatus according to claim 1, wherein the information processing apparatus is a printing apparatus.

8. The information processing apparatus according to claim 7, wherein
   the information processing apparatus is capable of receiving/transmitting data from/to an external apparatus via a first communication interface that is capable of establishing the wireless communication and a second communication interface that is different from the first communication interface,
   wherein the first service is a first printing service,
   wherein the second service is a second printing service,
   wherein information of the first printing service includes a name of the first printing service and information indicating that the information processing apparatus is capable of switching to a wireless connection for the direct wireless communication,
   wherein information of the second printing service includes a name of the second printing service, an IP address of the second communication interface, a uniform resource identifier (URI) for printing, and a port number, and
   wherein the at least one processor executes the instructions to further cause the information processing apparatus to establish a TCP connection to the terminal apparatus based on a TCP connection request when the TCP connection request including a destination to the second printing service is received from the terminal apparatus via the second communication interface.

9. An information processing method that an information processing apparatus having a first service and a second service, the method, comprising:
   notifying a plurality of services including at least the first service and the second service provided by the information processing apparatus;
   receiving a Peer-to-Peer connection request in which one service among the plurality of services is designated, from a terminal apparatus;
   connecting the information processing apparatus to the terminal apparatus with a direct wireless communication that is not via an external access point device, when the first service is designated by the received Peer-to-Peer connection request; and
   rejecting the connection request for connecting the information processing apparatus to the terminal apparatus with the direct wireless communication when the second service is designated by the received Peer-to-Peer connection request.

10. A non-transitory computer-readable recording medium storing a readable program for operating an information processing apparatus having a first service and a second service to execute an information processing method comprising:

notifying a plurality of services including at least the first service and the second service provided by the information processing apparatus;

receiving a Peer-to-Peer connection request in which one service among the plurality of services is designated, from a terminal apparatus;

connecting the information processing apparatus to the terminal apparatus with a direct wireless communication that is not via an external access point device, when the first service is designated by the received Peer-to-Peer connection request; and rejecting the connection request for connecting the information processing apparatus to the terminal apparatus with the direct wireless communication when the second service is designated by the received Peer-to-Peer connection request.

\* \* \* \* \*